(12) United States Patent (10) Patent No.: US 10,506,123 B2
Iwamoto et al. (45) Date of Patent: Dec. 10, 2019

(54) IMAGE PROCESSING DEVICE AND IMAGE PROCESSING SYSTEM

(71) Applicant: SEIKO EPSON CORPORATION, Tokyo (JP)

(72) Inventors: Kohei Iwamoto, Matsumoto (JP); Masahiko Hirasawa, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/905,913

(22) Filed: Feb. 27, 2018

(65) Prior Publication Data

US 2018/0249021 A1 Aug. 30, 2018

(30) Foreign Application Priority Data

Feb. 28, 2017 (JP) ................................ 2017-036022

(51) Int. Cl.
  *H04N 1/00* (2006.01)
  *H04N 1/21* (2006.01)
  (Continued)

(52) U.S. Cl.
  CPC ........... *H04N 1/0097* (2013.01); *G06F 3/122* (2013.01); *G06F 3/1229* (2013.01);
  (Continued)

(58) Field of Classification Search
  None
  See application file for complete search history.

(56) References Cited

U.S. PATENT DOCUMENTS

| 7,002,700 B1 * | 2/2006 | Motamed | H04N 1/00384 358/1.1 |
| 2005/0235196 A1 * | 10/2005 | Iwanaga | B41J 3/4075 715/277 |

(Continued)

FOREIGN PATENT DOCUMENTS

| EP | 1182607 | 2/2002 |
| JP | 2010-102398 A | 5/2010 |
| JP | 2015-145940 A | 8/2015 |

OTHER PUBLICATIONS

European Search Report issued in Application No. 18158940 dated Jun. 29, 2018.

*Primary Examiner* — Fan Zhang
(74) *Attorney, Agent, or Firm* — Workman Nydegger

(57) ABSTRACT

Provided is technology reducing the capacity required to store actual parameter information by establishing conditions enabling providing actual parameter information to the device that uses the actual parameter information. A control device 5 has label information storage 321 storing label information relationally to combinations of printer 3 models and print media; and actual content storage 322 storing, relationally to the label information, actual parameter information that is used by printers 3 to print to print media. When a combination of printer 3 model and print medium is identified and actual parameter information corresponding to that combination is requested, the control device 5 references the label information storage 321, identifies the label information corresponding to that combination, and acquires actual parameter information from the actual content storage 322 based on the identified label information.

8 Claims, 15 Drawing Sheets

(51) Int. Cl.
*G06F 3/12* (2006.01)
*H04N 1/60* (2006.01)
(52) U.S. Cl.
CPC .......... *G06F 3/1247* (2013.01); *G06F 3/1285* (2013.01); *G06F 3/1288* (2013.01); *H04N 1/00328* (2013.01); *H04N 1/2166* (2013.01); *H04N 1/603* (2013.01); *H04N 1/6097* (2013.01)

(56) References Cited

U.S. PATENT DOCUMENTS

| | | |
|---|---|---|
| 2010/0097649 A1 | 4/2010 | Akiyama |
| 2011/0134487 A1* | 6/2011 | Seto ................ H04N 1/6019 358/3.23 |
| 2013/0038886 A1 | 2/2013 | Kondo |
| 2015/0222775 A1 | 8/2015 | Adachi |
| 2017/0280022 A1* | 9/2017 | Kuroiwa .............. G06K 15/027 |
| 2018/0157990 A1* | 6/2018 | Allen ................ G06F 17/30339 |
| 2018/0181352 A1* | 6/2018 | Saito .................... G06F 3/1267 |

* cited by examiner

| MODEL IDENTIFIER | PRINTER PROVIDER IDENTIFIER | PRINT MEDIUM IDENTIFIER | PRINT MEDIA INFORMATION |
|---|---|---|---|

THE FOLLOWING PRINT MEDIA INFORMATION HAS BEEN REGISTERED.

Moderately Narrow / Average / Moderately High / Moderately Low / Red · Moderately Light · Desaturated / Purple · Dark · Moderately Saturated

| COLOR PROFILE TERM INFORMATION | COLOR PROFILE |
|---|---|
| Red/Dark/Dark | FILE F1 |
| Red/Moderately Dark/Moderately Dark | FILE F2 |
| Red/Average/Average | FILE F3 |

．
．
．

IMAGE PROCESSING DEVICE AND IMAGE PROCESSING SYSTEM

CROSS-REFERENCE TO RELATED APPLICATIONS

The entire disclosure of Japanese Patent Application No. 2017-036022, filed Feb. 28, 2017 is incorporated by reference herein.

BACKGROUND

1. Technical Field

The present invention relates to an image processing device and image processing system.

2. Related Art

Systems capable of configuring printing settings based on print control parameters (mechanical operating parameters) for a printer (image forming device) that can print on multiple types of print media (paper) are known from the literature. See, for example, JP-A-2015-145940.

Systems in which an image processing device (printing control device) generates and sends to a printer print data based on image processing parameters (an ICC profile) are also known from the literature. See, for example, JP-A-2010-102398.

The data size of the actual content of the parameter information, such as the print control parameters and image processing parameters, is large, and there is a need to minimize the storage capacity required to store the actual parameter information by establishing conditions enabling providing the actual parameter information as needed to the device that uses the actual parameter information.

SUMMARY

An objective of the invention is to store the actual parameter information as efficiently as possible by establishing conditions enabling providing the actual parameter information to the device that uses the actual parameter information.

To achieve the foregoing objective, an information processing device according to the invention has label information storage configured to store label information relationally to combinations of printer models and print media; and actual content storage configured to store, relationally to the label information, actual parameter information that is used to print to print media by a printer; and when a combination of printer model and print medium is identified and actual parameter information corresponding to that combination is requested, references the label information storage, identifies the label information corresponding to that combination, and acquires actual parameter information from the actual content storage based on the identified label information.

This configuration enables the information processing device to reduce the capacity required to store the actual parameter information by creating conditions enabling providing the actual parameter information to the device that uses the actual parameter information.

In an aspect of the invention, the label information is a term describing actual parameter information.

This configuration enables a person to intuitively and sensorially understand the content of the actual parameter information corresponding to the label information by simply reading the label information.

In another aspect of the invention, the label information is an index assigned to actual parameter information.

This configuration enables index values to simply express label information.

In another aspect of the invention, the actual content storage does not redundantly store actual parameter information; and the label information the label information storage stores may be redundantly applied to a combination of printer model and print medium.

This configuration enables the information processing device to reduce the capacity required to store the actual parameter information by creating conditions enabling providing the actual parameter information to the device that uses the actual parameter information.

In another aspect of the invention, actual parameter information is provided as a file of actual parameter information.

This configuration enables the information processing device to provide the actual parameter information as a file.

In another aspect of the invention, a request for actual parameter information is asserted by a device that uses the actual parameter information.

This configuration enables the information processing device to provide actual parameter information appropriately to the device that uses the actual parameter information.

In another aspect of the invention, the actual parameter information includes print control parameters that are set in a printer.

This configuration enables the information processing device to reduce the capacity required to store the print control parameters by creating conditions enabling providing the print control parameters to the printer.

In another aspect of the invention, the actual parameter information includes image processing parameters an image processing device uses in an image process when executing the image process to generate print data that is then output to a printer.

This configuration enables the information processing device to reduce the capacity required to store the image processing parameters by creating conditions enabling providing the image processing parameters to the image processing device.

In another aspect of the invention, the actual parameter information includes a color profile as the image processing parameter.

This configuration enables the information processing device to reduce the capacity required to store color profiles, which contain a large amount of data and more particularly require efficient storage.

In another aspect of the invention, a color profile is prepared for each of multiple printing modes of a printer.

This configuration enables efficiently storing color profiles for the multiple printing modes of a printer.

Another aspect of the invention is an information processing system including an information processing device capable of communicating with at least a printer; the information processing device having label information storage configured to store label information relationally to combinations of printer models and print media; actual content storage configured to store, relationally to the label information, actual parameter information that is used to print to print media by a printer; and a controller configured to, when a combination of printer model and print medium is identified and actual parameter information corresponding to that combination is requested, reference the label information storage, identify the label information corresponding to that combination, and acquire actual parameter information from the actual content storage based on the identified label information.

This configuration enables the information processing device to efficiently store the actual parameter information by creating conditions enabling providing the actual parameter information to the device that uses the actual parameter information.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 8 shows an example of a media list.

FIG. 9 shows an example of a completed registration report screen.

DESCRIPTION OF EMBODIMENTS

A preferred embodiment of the present invention is described below with reference to the accompanying figures.
Embodiment 1

Figure 1:
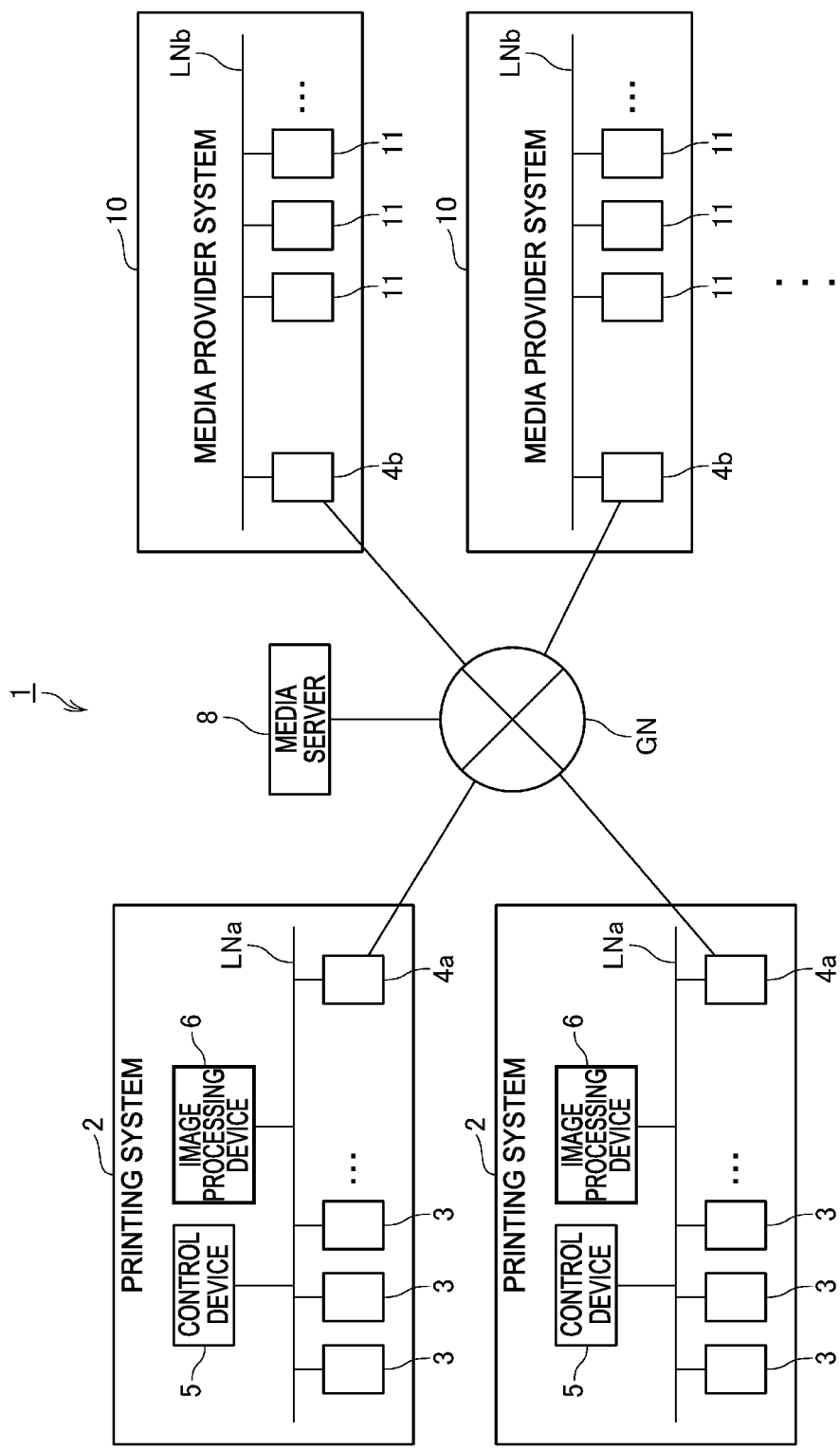
FIG. 1 is a block diagram illustrating the configuration of an information processing system according to the first embodiment of the invention.

FIG. 1 illustrates the configuration of an information processing system 1 according to this embodiment of the invention.

As shown in FIG. 1, the information processing system 1 includes multiple printing systems 2 connected to a global network GN such as the Internet, telephone network, or other communication network.

Each printing system 2 is a system deployed in an environment where printing is done by a printer 3. An example of an environment where the printing system 2 is deployed in this embodiment is a manufacturing plant of a company that provides a service such as producing printed materials that are printed by a printer 3 in response to customer requests, and supplying the printed materials to the customer.

Herein, a person using the printer 3 is referred to as simply the user.

The printing system 2 has a local area network LNa. The local area network LNa is a computer network configured in the environment where the printing system 2 is used.

Connected to the local area network LNa is a communication device 4a. The communication device 4a is an interface device connecting the local area network LNa to the global network GN. The communication device 4a has the functions of a modem (or ONU (Optical Network Unit)), a router, a NAT (Network Address Translation) device, and a DHCP (Dynamic Host Configuration Protocol) server. The communication device 4a passes data between devices when a device connected to the local area network LNa and a device connected to the global network GN communicate. Note that in FIG. 1 the communication device 4a is represented by a single block, but the communication device 4a may be configured from multiple devices corresponding to particular functions.

Multiple printers 3 are also connected to the local area network LNa. The printer 3 is a device in which print media is installed and which has functions for printing on the installed print medium. The print media are not limited to paper media, and means film, fiber, or other medium that can be loaded in the printer 3 and which the printer 3 can print on. The configuration, functions, and processes of the printer 3 are described below.

Note that a print medium being installed (loaded) in the printer 3 means that the printer 3 is in a condition able to print on the print medium, and how the print medium is installed may vary according to the type of print medium (including whether the print medium is a cut-sheet medium or roll paper).

A control device 5 (information processing device) and image processing device 6 are also connected to the local area network LNa. The configuration, functions, and processes of these devices are also described below.

As shown in FIG. 1, the information processing system 1 includes a media server 8 connected to the global network GN. The media server 8 is a server that can communicate with at least the printer 3, control device 5, and a terminal 11 described below as clients. The media server 8 is represented by a single block in FIG. 1, but this does not mean that the media server 8 is necessarily embodied by a single server device. For example, the media server 8 may comprise multiple server devices. In other words, the media server 8 may be configured in any way enabling it to execute the processes described below. The configuration, functions, and processes of the media server 8 are described below.

As shown in FIG. 1, the information processing system 1 also includes multiple media provider systems 10. A media provider system 10 is a system deployed in a facility managed by a provider of print media. The print media provider is, for example, a manufacturer that manufactures and sells print media. The facility managed by the print media provider is an office of the vendor, for example. For convenience, the print media provider is referred to below as the media provider. The media provider conceptually includes the organization that provided print media, and people associated with the organization.

The media provider system 10 includes a local area network LNb. The local area network LNb is a computer network used in the facility (environment) where the media provider system 10 is deployed. A communication device 4b connected to the local area network LNb. The communication device 4b a device with functions comparable to the communication device 4a described above.

Multiple terminals 11 are connected to the local area network LNb. A terminal 11 herein is a computer equipped with an LCD panel or other display means, and a mouse, keyboard, or other appropriate input means. A browser is also installed on the terminal 11. The terminal 11 is used by the media provider.

Figure 2:
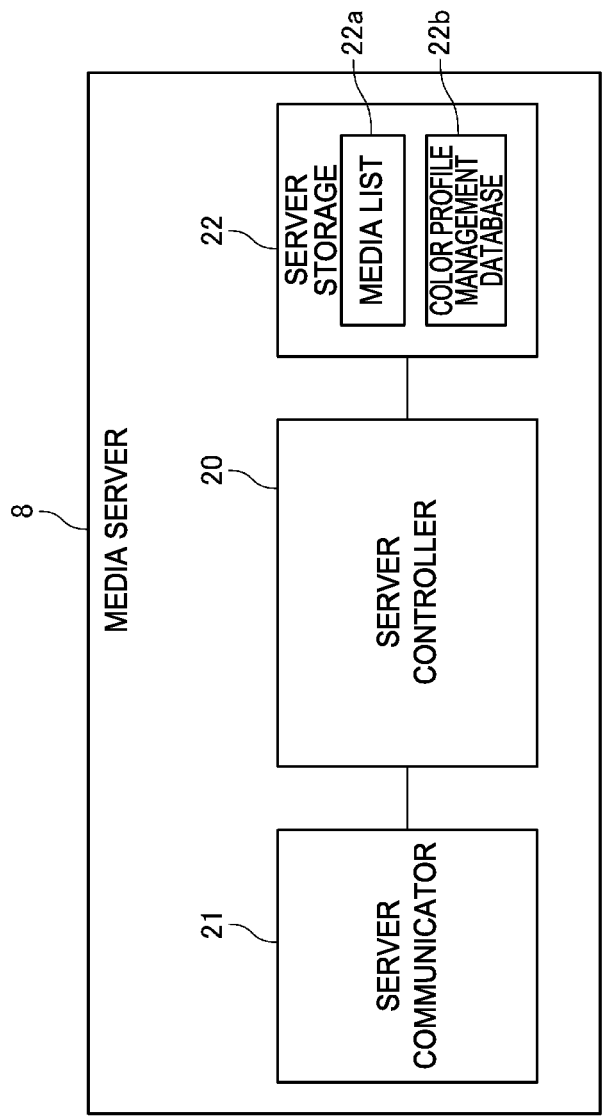
FIG. 2 is a block diagram illustrating the functional configuration of a media server.

FIG. 2 is a block diagram illustrating the functional configuration of the media server 8.

As shown in FIG. 2, the media server 8 includes a server controller 20, server communicator 21, and server storage 22.

The server controller 20 includes a CPU, ROM, RAM, and other signal processing circuits not shown, and controls other parts of the media server 8. The server controller 20 executes processes by the cooperation of hardware and software, such as a CPU reading and running a program copied from ROM or other server storage 22 to RAM, or by functions embedded in an ASIC, or by a signal processing circuit processing signals and executing processes.

The server communicator 21 communicates as controlled by the server controller 20 with devices connected to the global network GN according to a specific communication protocol.

The server storage 22 has a storage device including nonvolatile memory, and stores data. The server storage 22 stores a media list 22*a* and a color profile management database 22*b*. The media list 22*a* and color profile management database 22*b* are described below.

Figure 3:
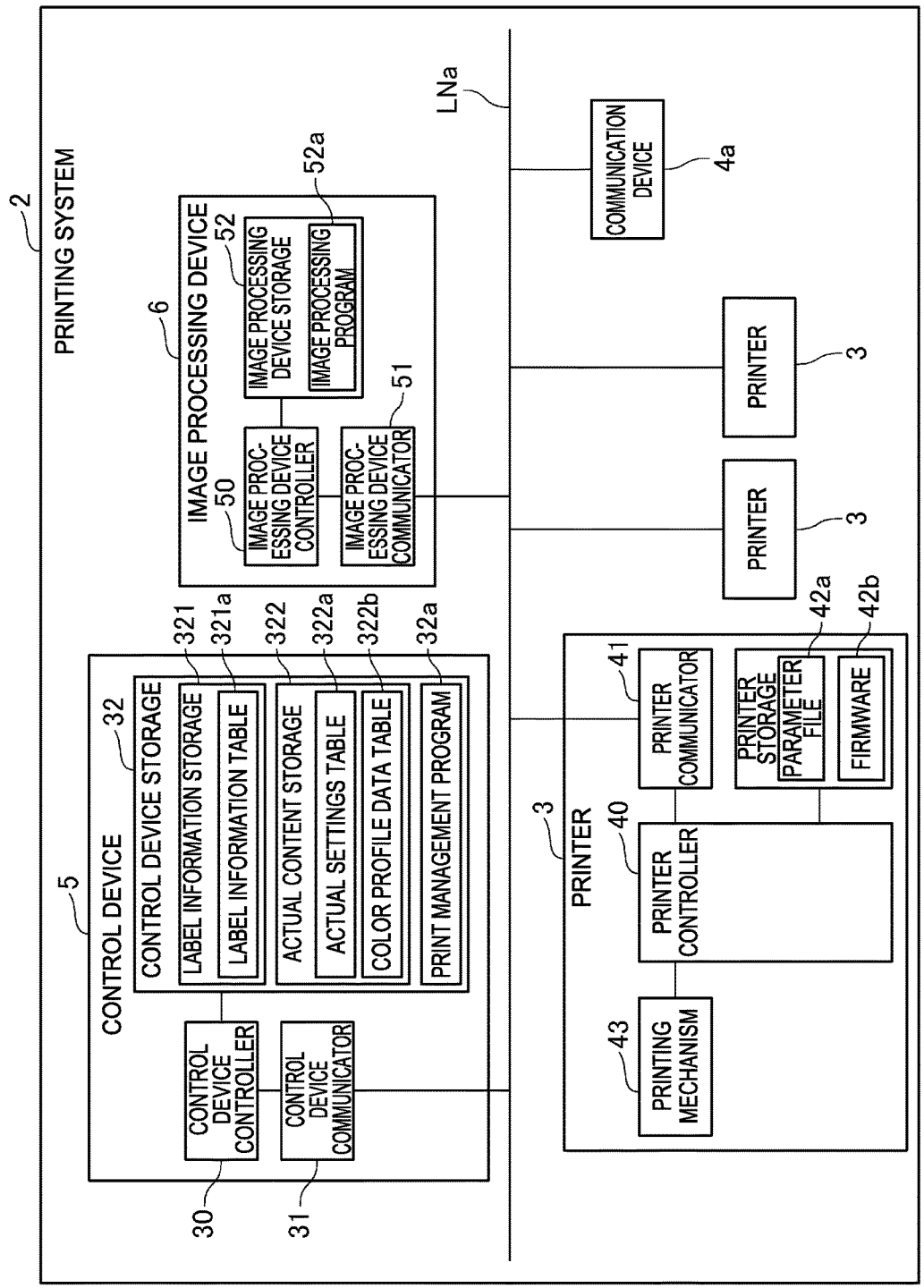
FIG. 3 is a block diagram illustrating the functional configuration of devices in the printing system.

FIG. 3 is a block diagram illustrating the functional configuration of the devices in the printing system 2.

The control device 5 is a computer that functions as a server on the local area network LNa with the image processing device 6 and printer 3 as clients.

As shown in FIG. 3, the control device 5 includes a control device controller 30 (control device), control device communicator 31, and control device storage 32.

The control device controller 30 includes a CPU, ROM, RAM, and other signal processing circuits not shown, and controls other parts of the control device 5. The control device controller 30 executes processes by the cooperation of hardware and software, such as a CPU reading and running a program copied from ROM or other control device storage 32 to RAM, or by functions embedded in an ASIC, or by a signal processing circuit processing signals and executing processes.

The control device communicator 31, as controlled by the control device controller 30, communicates with devices connected to the local area network LNa or global network GN according to a specific communication protocol.

The control device storage 32 comprises an EEPROM or other nonvolatile memory device, and stores data.

The control device storage 32 has label information storage 321. The label information storage 321 stores a label information table 321*a*. The label information table 321*a* is described further below.

The control device storage 32 also has an actual content storage 322. The actual content storage 322 stores a settings content table 322*a* and a color profile content table 322*b*. The settings content table 322*a* and color profile content table 322*b* are described further below.

A print management program 32*a* is installed on the control device 5. The control device controller 30 reads and runs the print management program 32*a*, and executes processes by the functions of the print management program 32*a*.

Various types of print media can be loaded in the printer 3, which is an inkjet printer that ejects ink from an inkjet head to form dots on the loaded print medium, and prints images.

More particularly, the printer 3 according to this embodiment is a large format printer (LFP) to which large media can be installed as the print medium. In one example, A0 size sheet media can be loaded as the print medium, and in another example roll paper with a paper width exceeding 900 mm can be installed.

As shown in FIG. 3, the printer 3 has a printer controller 40, printer communicator 41, printer storage 42, and printing mechanism 43.

The printer controller 40 includes a CPU, ROM, RAM, and other signal processing circuits not shown, and controls other parts of the printer 3. The printer controller 40 executes processes by the cooperation of hardware and software, such as a CPU reading and running a program copied from ROM or other printer storage 42 to RAM, or by functions embedded in an ASIC, or by a signal processing circuit processing signals and executing processes.

The printer communicator 41, as controlled by the printer controller 40, communicates with devices connected to the local area network LNa or global network GN according to a specific communication protocol.

The printer storage 42 comprises an EEPROM or other nonvolatile memory device, and stores data. The printer storage 42 stores a parameter file 42*a*. The parameter file 42*a* is described further below.

Firmware 42*b* is installed on the printer 3. The printer controller 40 executes processes by functions of the firmware 42*b* by reading and running the firmware 42*b*.

The printing mechanism 43 in this embodiment includes an inkjet head that ejects ink and forms dots on the print medium installed in the printer 3; a platen disposed to a position opposite the printhead to support the print medium; a suction fan for maintaining an appropriate platen gap between the inkjet head and the print medium positioned to the platen; a carriage for moving the inkjet head; a conveyance mechanism for conveying the print medium; a tension mechanism for adjusting the tension on the print medium conveyed by the conveyance mechanism; and a heater for drying the print medium after ink is deposited thereon.

The printer controller 40 controls the printing mechanism 43 to print images on the print medium installed to the printer 3.

The printer 3 has a plurality of printing modes. Each printing mode depends on a specific combination of print resolution and number of printhead passes. The number of printhead passes means the number of passes the inkjet head makes to print an image in the same area of the print medium when printing on the print medium. The print resolution and number of passes can be set by the user, and a printing mode is determined by setting the print resolution and number of passes.

The image processing device 6 is a computer that functions as a host computer in relation to the printer 3.

As shown in FIG. 3, the image processing device 6 has an image processing device controller 50, image processing device communicator 51, and image processing device storage 52.

The image processing device controller 50 includes a CPU, ROM, RAM, and other signal processing circuits not shown, and controls other parts of the printer 3. The image processing device controller 50 executes processes by the cooperation of hardware and software, such as a CPU reading and running a program copied from ROM or other image processing device storage 52 to RAM, or by functions embedded in an ASIC, or by a signal processing circuit processing signals and executing processes.

The image processing device communicator 51, as controlled by the image processing device controller 50, communicates with devices connected to the local area network LNa or global network GN according to a specific communication protocol.

The image processing device storage 52 comprises an EEPROM or other nonvolatile memory device, and stores data.

An image processing program 52a is installed on the image processing device 6. The image processing device controller 50 executes processes as described below through functions of the image processing program 52a by executing the image processing program 52a.

The image processing program 52a includes RIP (raster image processor) software that generates raster data for the image printed by the printer 3. Raster data is data storing, for each dot in a dot matrix pattern, a gradation value for a specific gradation indicating how much ink to eject for each color of ink the printer 3 can eject (in this example, cyan (C), magenta (M), yellow (Y), black (K)).

By a function of the RIP software, the image processing device controller 50 generates raster data using a color profile. The ICC (International Color Consortium) profile is a commonly used color profile. The appropriate color profile to use for generating raster data depends upon the specific combination of the model of printer 3 that will print based on the raster data, the print medium to which the printer 3 prints, and the printing mode of the printer 3.

As described above, the printer storage 42 of the printer 3 stores a parameter file 42a. The parameter file 42a is a file relationally storing information (referred to below as a setting identifier) identifying a specific setting (parameter), and the value set for that parameter. The parameters include a parameters related to the mechanism whereby the printer 3 prints on print media. In this example, these parameters include platen gap parameters, tension parameters, suction parameters, and heater temperature parameters.

The platen gap parameter is a parameter related to the distance between the inkjet head and the platen (referred to below as the platen gap). The platen gap range depends on the model of printer 3. The platen gap parameter is a value indicating the platen gap.

The tension parameter is a parameter related to the tension applied to the print medium by the tension mechanism (referred to below as simply the tension). In this embodiment, the amount of tension is expressed by a tension level, which changes in steps. The number of levels depends upon the model of printer 3. The value set to the tension parameter is the level of tension.

The suction parameter is a parameter related to the suction created by the suction fan. In this embodiment, the amount of suction produced by the suction fan is expressed by a suction level, which changes in steps. The number of levels depends upon the model of printer 3. The value set to the suction parameter is the level of suction produced by the suction fan.

The heater temperature parameter is a parameter related to the temperature of the heater. The heater temperature range depends on the model of printer 3. The value set to the heater temperature parameter is a value indicating the temperature of the heater.

Note that the parameters used in this embodiment are examples that simplify describing the invention, and other parameters may also be set in addition to the foregoing examples or in substitution for one or more of the above examples. Other parameters may include, for example, parameters related to the conveyance speed at which the conveyance mechanism conveys the print medium, and parameters related to the frequency of inkjet head cleaning (maintenance).

When the printer 3 prints to a print medium, it prints based on the values set for the specific parameters. For example, when the printer 3 prints on a print medium, the printer 3 sets the platen gap to the value set to the platen gap parameter, sets the tension level to the value set to the tension parameter, sets the suction level of the suction fan to the value set to the suction parameter, sets the temperature of the heater to the value set to the heater temperature parameter, and then prints.

The appropriate value to be set for any parameter differs according to the specific combination of the model of printer 3, and the specific print medium the printer 3 prints on. Because specific characteristics differ according to the print medium (material, size, strength, for example), and printer 3 specifications differ according to the model of printer 3, whether or not print quality improves when printed in a specific way differs according to the specific combination of the model of printer 3 and the print medium loaded in the printer 3.

As a result, for each print medium provided by a media provider, the media provider can determine the appropriate value to be set for each parameter for each model of printer 3, and store data containing the appropriate parameter values for each model of printer 3 on the media server 8, control device 5, or other specific device. In this case, data containing the appropriate values for each parameter is stored on the specific device for each combination of print medium and model of printer 3. This, however, presents the following problem. That is, the number of combinations of printer 3 models and print media is extremely large, can be expected to increase in the future, and the amount of data that the specific device must store increases accordingly.

As described above, the image processing device 6, based on the color profile, generates raster data for the images the printer 3 is to print.

As also described above, the appropriate color profile for the image processing device 6 to use to generate the raster data differs according to the model of printer 3 that will print based on the raster data, the print medium the printer 3 prints to, and the printing mode of the printer 3.

Furthermore, as also described above, because there are many different models of printers 3 and print media, and both can be expected to increase in the future, a system in which color profiles are stored on a specific device such as the media server 8 or control device 5, and the image processing device 6 communicates with the specific device to acquire the appropriate color profile, would be useful and desirable.

However, storing color profiles on a specific device also poses problems. Specifically, when color profiles for each possible combination of printer 3 model, print medium, and printing mode are stored on a specific device, the amount of data that must be stored on the specific device increases dramatically. More particularly, because a color profile contains a large amount of data, the amount of data that must be stored is extremely large if a color profile for every possible combination of printer 3 model, print medium, and printing mode is stored on a specific device.

Based on the foregoing, the devices in a information processing system 1 according to this embodiment are configured as described below and execute the processes described below.

Information processing system 1 processes when registering print media information in the media list 22a Operation of the devices in the information processing system 1 when the media provider registers print media information (described below) in the media list 22a is described first.

Figure 4:
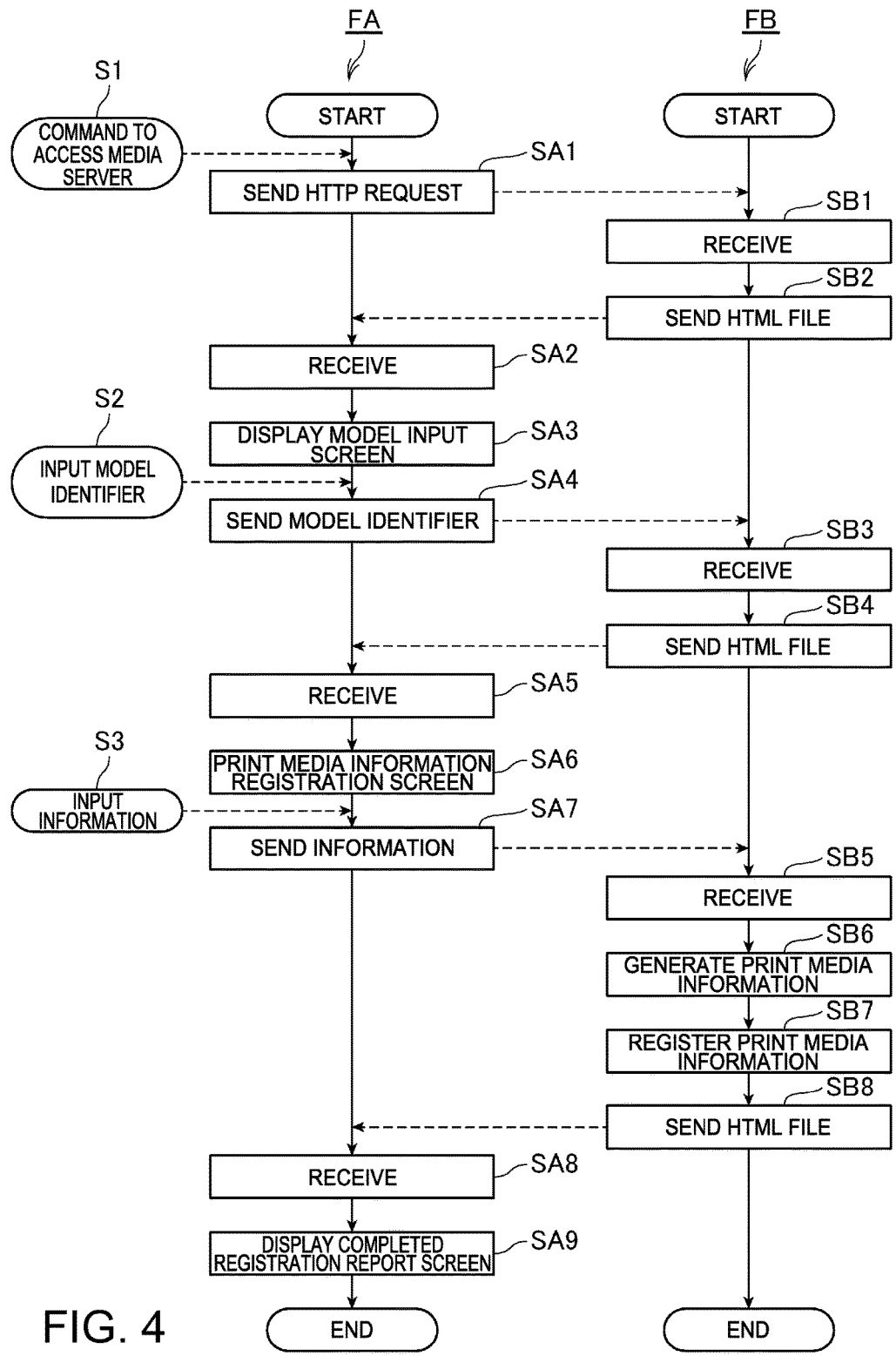
FIG. 4 is a flow chart of the operation of a terminal and media server.

FIG. 4 is a flowchart showing the operation of the terminal 11 and media server 8 when registering print media information in the media list 22a. Flow chart FA in FIG. 4 shows the operation of the terminal 11, and flow chart FB shows the operation of the media server 8.

In the description referring to the flow charts in FIG. 4, the media provider registers print media information related to the appropriate settings to be set for the parameters of the printer 3 of a specific model, and the color profile to be used, when the printer 3 of the specific model prints to a specific print medium supplied by the media provider.

Note that while not described in detail below, the media server 8 and other devices communicate securely using encryption technology and virtual private network technology. When accessed from another device, the media server 8 may also execute appropriate authentication as necessary.

As shown in flowchart FA in FIG. 4, when registering print media information, the media provider starts the browser on the terminal 11 and inputs a command to access a specific URL on the media server 8 (step S1). The URL is previously made known to the media provider by a specific method.

In response to the command from the media provider, the terminal 11 sends a corresponding HTTP request to the media server 8 (step SA1).

As shown in flowchart FB in FIG. 4, the server controller 20 of the media server 8 controls the server communicator 21 to receive the HTTP request (step SB1).

Next, the server controller 20, in response to the received HTTP request, generates and sends to the terminal 11 an HTML file for displaying a media type input screen G1 (FIG. 5) (step SB2).

As shown in flow chart FA in FIG. 4, the terminal 11 then receives the HTML file (step SA2).

Next, the terminal 11, based on the received HTML file, displays the media type input screen G1 on the display means (step SA3).

Figure 5:
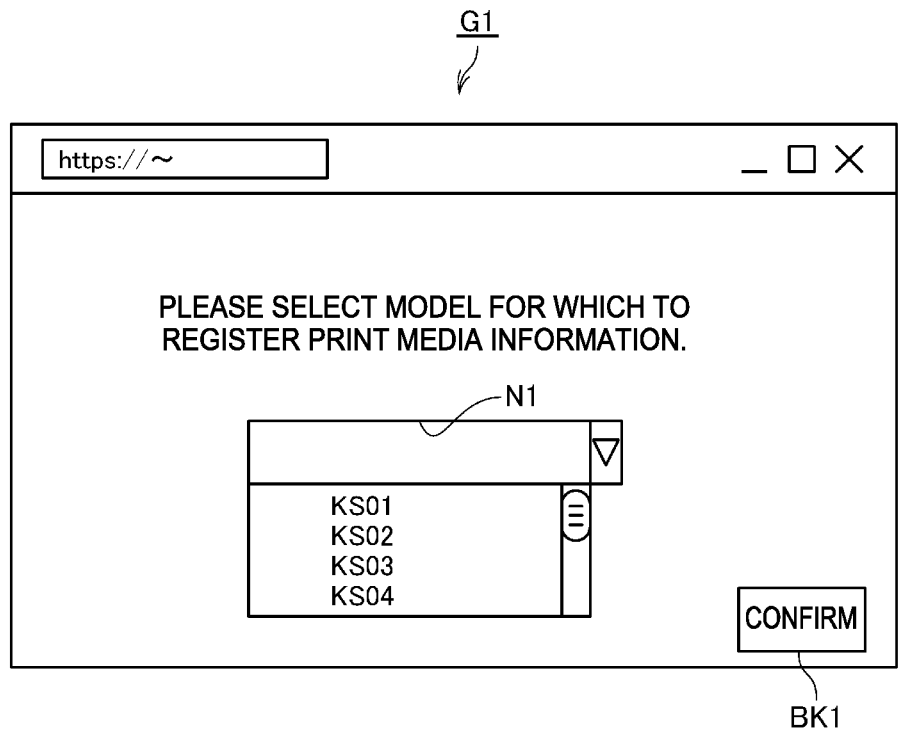
FIG. 5 shows an example of a media type input screen.

FIG. 5 shows an example of a media type input screen G1.

As shown in FIG. 5, the media type input screen G1 has an input field N1 for inputting information identifying a specific printer 3 model (referred to below as the model identifier). The input field N1 is a pull-down menu, and in the pull-down menu are displayed model identifiers for selectable models as items, and enables inputting a model identifier to the input field N1 by selecting a model identifier from among the model identifiers displayed in the pull-down menu. The media type input screen G1 also has a Confirm button BK1 for confirming input to the input field N1.

The media provider inputs to the media type input screen G1 model identifier indicating the model of printer 3 for which to register print media information, and then operates the Confirm button BK1 (step S2).

Below, the model identified by the model identifier the media provider input to the input field N1 is referred to as the selected model.

In response to operation of the Confirm button BK1, the terminal 11, by a function of a script embedded in the HTML file, sends the model identifier input by the media provider to the media server 8 (step SA4).

As shown in flowchart FB in FIG. 4, the server controller 20 of the media server 8 then controls the server communicator 21 to receive the model identifier (step SB3).

Next, the server controller 20, based on the received model identifier, acquires model-related information, and based on the acquired model-related information, generates and sends to the terminal 11 an HTML file for displaying the print media information registration screen G2 (FIG. 6) (step SB4).

The model-related information is information required to generate the HTML file for displaying the print media information registration screen G2. The model-related information is relationally registered to the model identifier in a specific database stored by the server storage 22.

As shown in flow chart FA in FIG. 4, the terminal 11 then receives the HTML file (step SA5).

Next, the terminal 11, based on the received HTML file, displays the print media information registration screen G2 on the display means (step SA6).

Figure 6:
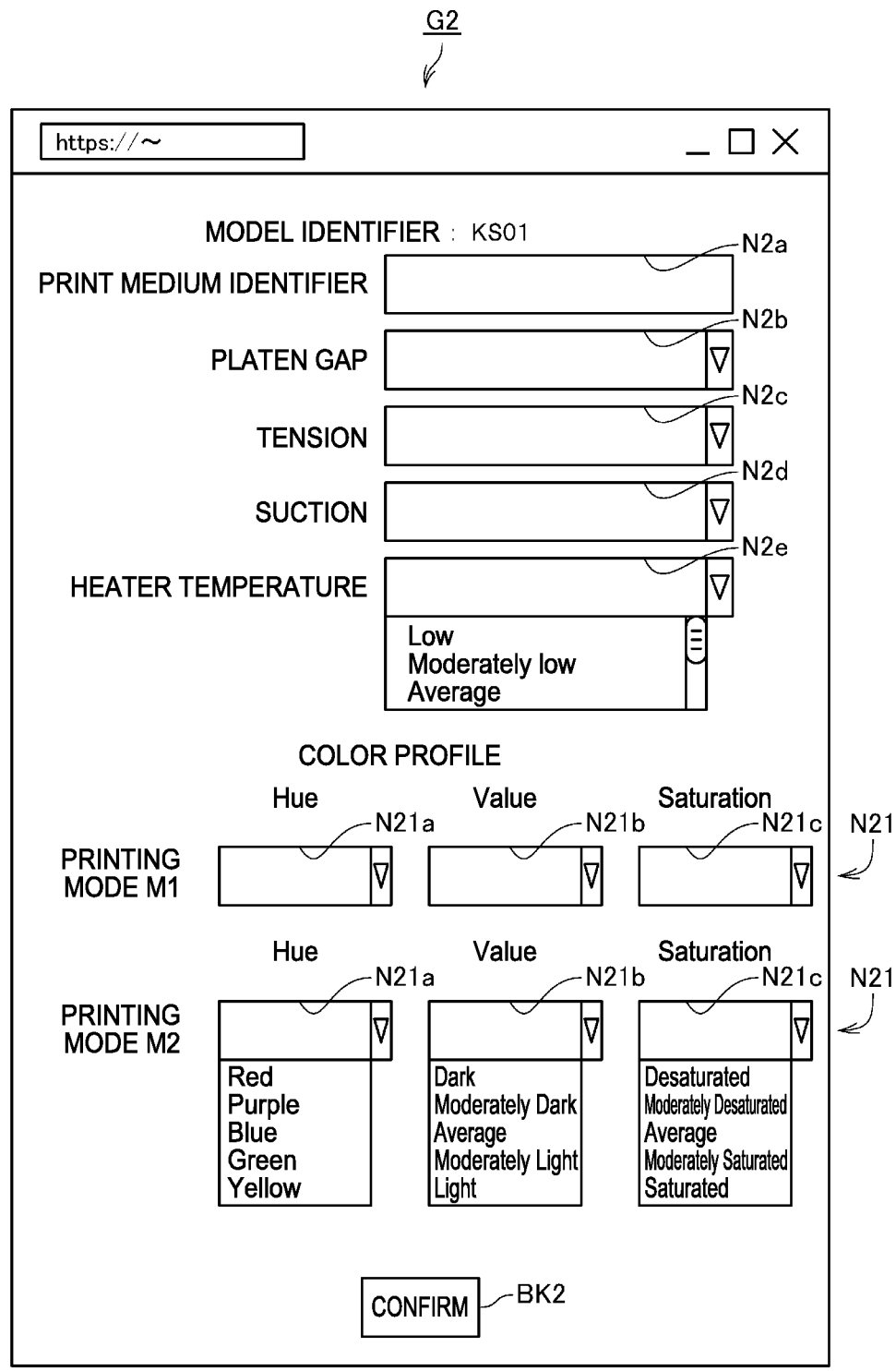
FIG. 6 shows an example of a print media information registration screen.

FIG. 6 shows an example of a print media information registration screen G2.

As shown in FIG. 6, the print media information registration screen G2 has an input field N2a for inputting information identifying the print medium (referred to below as the print medium identifier). The media provider inputs to the input field N2a the print medium identifier of the print medium for which to register print media information.

Below, the print medium for which the media provider registers print media information is referred to as the registered print medium.

As shown in FIG. 6, the print media information registration screen G2 has an input field N2b for inputting a parameter value term related to the platen gap parameter; an input field N2c for inputting a parameter value term related to the tension parameter; an input field N2d for inputting a parameter value term related to the suction parameter; and an input field N2e for inputting a parameter value term related to the heater temperature parameter.

Parameter value terms are described below using the platen gap parameter as an example.

In this example, the platen gap of a printer 3 of a particular model can be set in the range from 1.0 mm to 9.0 mm. Candidate parameter values are predefined for the platen gap parameter of the printer 3 of the particular model. In this example, there are five candidate parameter values that can be set for the platen gap parameter of the printer 3 of the particular model, specifically 1.0 mm, 3.0 mm, 5.0 mm, 7.0 mm, and 9.0 mm.

A parameter value term is also previously defined for each candidate parameter value. A parameter value term is a term abstractly representing a particular parameter value.

In this example, Narrow is defined as the parameter value term for the candidate parameter value 1.0 mm; Moderately Narrow is defined as the parameter value term for the candidate parameter value 3.0 mm; Average is defined as the parameter value term for the candidate parameter value 5.0 mm; Moderately Wide is defined as the parameter value term for the candidate parameter value 7.0 mm; and Wide is defined as the parameter value term for the candidate parameter value 9.0 mm.

In this example, a parameter value term is an adjectival expression of the state of a parameter when the corresponding candidate parameter value is set for the parameter. In other words, a parameter value term is a term enabling the user to intuitively or sensorially understand the state of a parameter when the corresponding candidate parameter value is set for the parameter. A parameter value term using a different adjectival expression is assigned to each candidate parameter value.

In this example as described above, Narrow is defined as the parameter value term for the candidate parameter value 1.0 mm. Based on the values that can be set as the platen gap ranging from 1.0 mm to 9.0 mm, and the parameter value term Moderately Narrow, the parameter value term Average, the parameter value term Moderately Wide, and the parameter value term Wide being defined for the other candidate parameter values, the following can also be said.

That is, the parameter value term Narrow adjectivally expresses the degree of the state of the platen gap (the state of the parameter) when the platen gap parameter is set to the value 1.0 mm. Understanding the parameter value term Narrow, the user can therefore intuitively and sensorially know that the state of the platen gap is relatively small (narrow) when the candidate parameter value corresponding to the parameter value term Narrow is set for the platen gap parameter.

Parameter value terms are described above using the example of the platen gap parameter, but parameter value terms such as described below are may also be assigned for other parameters used as examples in this embodiment.

For example, the level of tension applied to the print medium in a printer 3 of a particular model may be set to any of nine levels, level L1 to level L9. In this example, tension increases in steps from level L1 to level L9. There are also five levels, level L1, level L3, level L5, level L7, level L9, that are predefined as the candidate parameter values that can be set for the tension parameter of the printer 3 of a particular model. In this example, the parameter value term Low is assigned to the candidate parameter value level L1; the parameter value term Moderately Low is assigned to the candidate parameter value level L3; the parameter value term Average is assigned to the candidate parameter value level L5; the parameter value term Moderately High is assigned to the candidate parameter value level L7; and the parameter value term High is assigned to the candidate parameter value level L9.

For further example, the level of suction applied to the print medium in a printer 3 of a particular model may be set to any of nine levels, level L1 to level L9. In this example, suction increases in steps from level L1 to level L9. There are also five levels, level L1, level L3, level L5, level L7, level L9, that are predefined as the candidate parameter values that can be set for the suction parameter of the printer 3 of a particular model. In this example, the parameter value term Low is assigned to the candidate parameter value level L1; the parameter value term Moderately Low is assigned to the candidate parameter value level L3; the parameter value term Average is assigned to the candidate parameter value level L5; the parameter value term Moderately High is assigned to the candidate parameter value level L7; and the parameter value term High is assigned to the candidate parameter value level L9.

For further example, the range of temperatures of the heater in a printer 3 is from 30° C. to 70° C. In this example, suction increases in steps from level L1 to level L9. There are also five values, 30° C., 40° C., 50° C., 60° C., 70° C., that are predefined as the candidate parameter values that can be set for the heater temperature parameter of the printer 3 of a particular model. In this example, the parameter value term Low is assigned to the candidate parameter value 30° C.; the parameter value term Moderately Low is assigned to the candidate parameter value 40° C.; the parameter value term Average is assigned to the candidate parameter value 50° C.; the parameter value term Moderately High is assigned to the candidate parameter value 60° C.; and the parameter value term High is assigned to the candidate parameter value 70° C.

The parameter value terms may also be referred to as label information.

As shown in FIG. 6, the print media information registration screen G2 also has an input field N2*b* for inputting a parameter value term for the platen gap parameters. The input field N2*b* is a pull-down menu. A list of parameter value terms assigned to the candidate parameter values that can be set for the platen gap parameter of the selected model (the printer 3 model identified by the model identifier the user input to input field N1 of the media type input screen G1) are displayed in the pull-down menu of the input field N2*b*.

The media provider selects the parameter value term corresponding to the appropriate parameter value to set for the platen gap parameter from among the parameter value terms shown in the pull-down menu of the input field N2*b*. The parameter value term selected by the media provider is input to the input field N2*b* based on the selected parameter value term. Tests or simulations related to printing on the print medium by the printer 3 of the selected model are previously performed, and the media provider selects the appropriate parameter value term from among the parameter value terms listed in the pull-down menu of the input field N2*b*.

The media provider similarly uses the input field N2*c* for the tension parameter, the input field N2*d* for the suction parameter, and the input field N2*e* for the heater temperature parameter to input the parameter value term corresponding to the appropriate parameter value to be set for the corresponding parameters.

As described above, to specify the parameter value to be set for the corresponding parameters when registering print media information, the media provider can simply select the parameter value term assigned to a particular candidate parameter value, and does not need to input the actual value. User convenience is therefore excellent for the media provider.

As shown in FIG. 6, the print media information registration screen G2 has an input field N21 for each printing mode of the printer 3.

The input fields N21 include input field N21*a,* input field N21*b,* and input field N21*c.*

Input fields N21 are input fields for inputting color profile term information. The color profile term information is information including a combination of a hue term, value term, and saturation term. Input field N21*a* is an input field for inputting the hue term, input field N21*b* is an input field for inputting the value term, and input field N21*c* is an input field for inputting the saturation term.

When raster data is generated based on a color profile, bitmap data, which is comprised of dots (referred to below as pre-conversion dots) storing the amount of each color component expressed by the colors red (R), green (G), and blue (B), to raster data, which is comprised of dots (referred to below as converted dots) storing the amount of each color of ink (for example, cyan (C), magenta (M), yellow (Y), black (K)) that the printer 3 can eject as the gradation value for a specific gradation.

The hue term adjectivally expresses the gradient of the hue of the converted dots when converting pre-conversion dots to converted dots. In other words, the hue term is a term enabling the user to intuitively and sensorially recognize the hue expressed by the hue term.

In this example, the hue terms include the hue term Red indicating the hue is red; the hue term Purple indicating the hue is purple; the hue term Blue indicating the hue is blue; the hue term Green indicating the hue is green; and the hue term Yellow indicating the hue is yellow.

When the gradient of the hue of the converted dots is red, and pre-conversion dots are converted to converted dots, the coefficient used for the conversion is adjusted so that the gradient of the hue of the converted dots is red.

The value term adjectivally expresses the gradient of the value of the converted dots when converting pre-conversion dots to converted dots. In other words, the value term is a term enabling the user to intuitively and sensorially recognize the value expressed by the value term.

In this example, the value terms include the value term Dark; the value term Moderately Dark; the value term Moderately Light; and the value term Light.

Of these value terms, the value term Dark indicates the lowest value, and value increases sequentially from Dark to Moderately Dark, to Moderately Light, and to Light.

The saturation term adjectivally expresses the gradient of the saturation of the converted dots when converting pre-conversion dots to converted dots. In other words, the saturation term is a term enabling the user to intuitively and sensorially recognize the color saturation expressed by the saturation term.

This example uses the saturation term Desaturated, the saturation term Moderately Desaturated, the saturation term Average, the saturation term Moderately Saturated, and the saturation term Saturated.

Of these saturation terms, the saturation term Desaturated indicates the lowest degree of saturation, and saturation increases sequentially from Desaturated to Moderately Desaturated, to Average, to Moderately Saturated, and to Saturated.

These color profile terms are another example of label information.

Input field N21a, input field N21b, and input field N21c are pull-down menus. Input field N21a presents a list of selectable hue terms as menu items. Input field N21b presents a list of selectable value terms as menu items. Input field N21c presents a list of selectable saturation terms as menu items. The media provider selects one item from the terms listed in the pull-down menu of each input field.

As shown in FIG. 6, print media information registration screen G2 also has a Confirm button BK2 for confirming input to the input fields in the print media information registration screen G2.

The media provider inputs information the input fields of the print media information registration screen G2, and then operates the Confirm button BK2 (step S3).

As shown in flow chart FA in FIG. 4, in response to operation of the Confirm button BK2, the terminal 11, by a function of a script embedded in the HTML file, sends the information input to the input fields of the print media information registration screen G2 to the media server 8 (step SA7).

As shown in flowchart FB in FIG. 4, the server controller 20 of the media server 8 then controls the server communicator 21 to receive the information (step SB5).

Next, the server controller 20, based on the information received in step SB5, generates print media information (step SB6).

The print media information is described below.

Figure 7:
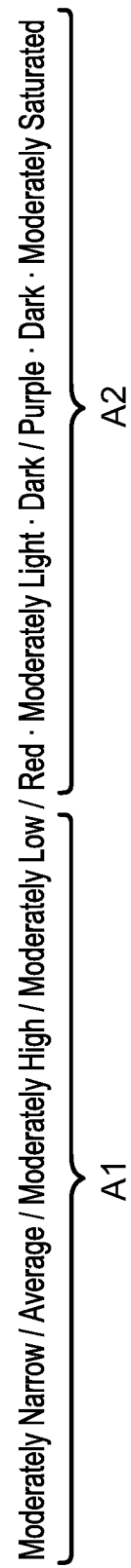
FIG. 7 shows an example of print media information.

FIG. 7 shows an example of print media information.

The print media information includes a first area A1 and a second area A2 following the first area A1.

In the first area A1 of the print media information corresponding to a specific combination of printer 3 model and print medium, the parameter value terms corresponding to each parameter of a printer 3 of that model are listed in a predetermined order of parameters, separated by a first delimiter character. Each parameter value term of the print media information is a parameter value term corresponding to the candidate to be set for a specific parameter from among the group of candidate parameter values that can be set for the corresponding parameter.

In the first area A1 of the print media information shown in the example in FIG. 7, the parameter value terms for the corresponding parameters are separated by the first delimiter character (in the example in FIG. 7, a forward slash (/)) and listed in the predefined order of parameters, in this example, the platen gap parameter, tension parameter, suction parameter, and heater temperature parameter.

In the second area A2 of the print media information corresponding to a specific combination of printer 3 model and print medium, the color profile terms corresponding to each printing mode of a printer 3 of that model are listed in a predetermined order of printing modes, separated by the first delimiter character. In the example in FIG. 7, the color profile term information comprises the hue term, value term, and saturation term listed in the same order separated by a second delimiter character (a bullet character (●) in the example in FIG. 7) different from the first delimiter character. The color profile term information of the print media information contains the color profile terms corresponding to the color profile that is appropriate for the image processing device 6 to use when the printer 3 is set to the corresponding printing mode.

In the second area A2 of the print media information in the example in FIG. 7, the color profile term information corresponding to two printing modes is listed separated by the first delimiter character in a predetermined order of printing modes.

In step SB6, the server controller 20 executes the following process based on the information received in step SB5.

Specifically, the information received in step SB5 includes the parameter value terms the media provider selected for each of the definable parameters. The server controller 20 generates the first area A1 portion of the print media information by arranging the parameter value terms included in the information received in step SB5 in the specific order defined for each selected model.

The information received in step SB5 also includes the color profile term information (a combination of hue terms, value terms, and saturation terms) selected by the media provider for each printing mode. The server controller 20 generates the second area A2 portion of the print media information by arranging the color profile terms included in the information received in step SB5 in the specific order defined for each selected model.

The parameter value terms selected by the media provider are the parameter value terms corresponding to candidate parameter values that can be appropriately set for specific parameters for a specific combination of a printer 3 of a selected model and registered print medium. The color profile term information selected by the media provider is color profile term information for a color profile appropriate for use by the image processing device 6 for a specific combination of a printer 3 of a selected model and registered print medium.

As described above, the parameter value terms are written in a predetermined order of parameters in the first area A1 of the print media information. Each parameter value term in the print media information is a parameter value term corresponding to a candidate parameter value that is appropriate for setting to the corresponding parameter. The color profile term information is similarly written in a predetermined order of printing modes in the second area A2 of the print media information.

The effect of configuring the print media information in this way is described below.

That is, when the user reads the first area A1 of the print media information corresponding to a specific combination of printer 3 model and a single print medium, the user can intuitively and sensorially understand the values to be set for the parameters of a printer 3 of that model, and can anticipate the characteristics of the print medium (material, size, strength, for example).

Likewise, when the user reads the second area A2 of the print media information corresponding to a specific combination of printer 3 model and single print medium, the user can intuitively and sensorially understand the content of the color profile appropriate for use in each printing mode of a printer 3 of that model.

Because the print media information has a simple structure in which the parameter value terms and color profile term information are listed in a predetermined order, the print media information can be standardized by standardizing the parameter value terms and color profile term information and standardizing the order in which the parameter value terms and color profile term information are arranged. This structure is therefore useful for standardization.

As shown in flow chart FB in FIG. 4, after generating the print media information in step SB6, the server controller 20 registers the generated print media information in the media list 22a (step SB7).

The media list 22a is a database of records for specific combinations of printer 3 models and print media.

FIG. 8 illustrates the content of one record in the media list 22a.

As shown in FIG. 8, a record in the media list 22a stores a model identifier, printer provider identifier, print medium identifier, and print media information.

The printer provider identifier is information identifying the provider (supplier; referred to below as the printer provider) of the printer 3, such as the company that manufactured and sold the printer 3 (referred to below as the printer manufacturer).

In step SB7, the server controller 20 register the model identifier of the selected model, the printer provider identifier of the entity that provided the printer 3 of the selected model, the print medium identifier of the registered print medium, and the record storing the print media information generated in step SB6 in the media list 22a. Note that the printer provider identifier of the entity that provided the printer 3 is stored relationally in the server storage 22 of the media server 8 to the model identifier for each model of printer 3.

Each record in the media list 22a thus stores a printer provider identifier. This enables using the printer provider identifier as a search key when looking for a specific record in the records of the media list 22a, and thereby improves search efficiency and improves user convenience. The records of the media list 22a may obviously alternatively be configured to include the printer provider identifier in the model identifier instead of storing the printer provider identifier separately from the model identifier.

The operation of step SB7 completes registering print media information in the media list 22a.

A media list 22a is thus stored on the media server 8 as described above. The entity that maintains the media server 8 does not need to be a single printer provider. For example, an entity other than the printer provider may maintain the media server 8 storing a media list 22a for models of printers 3 supplied by multiple different printer providers.

Next, the server controller 20 generates and sends an HTML file for displaying the completed registration report screen G3 (FIG. 9) to the terminal 11 (step SB8).

As shown in flow chart FA in FIG. 4, the terminal 11 then receives the HTML file (step SA8).

Next, the terminal 11, based on the received HTML file, displays the completed registration report screen G3 on the display means (step SA9).

FIG. 9 shows an example of a completed registration report screen G3.

As shown in FIG. 9, print media information and information indicating that registration of the print media information was completed is displayed in the completed registration report screen G3. The media provider can know, by reading the completed registration report screen G3, the content of the print media information and that registration of the print media information was completed.

Note also that while further detailed description is omitted, the media provider may also change the content of print media information registered in the media list 22a, and may also delete records for specific print media information from the records registered in the media list 22a, by a specific method at a desired time.

Processes of the Information Processing System 1 when Printing by the Printer 3

Processes executed by devices in the information processing system 1 when printing by the printer 3 are described next.

Figure 10:
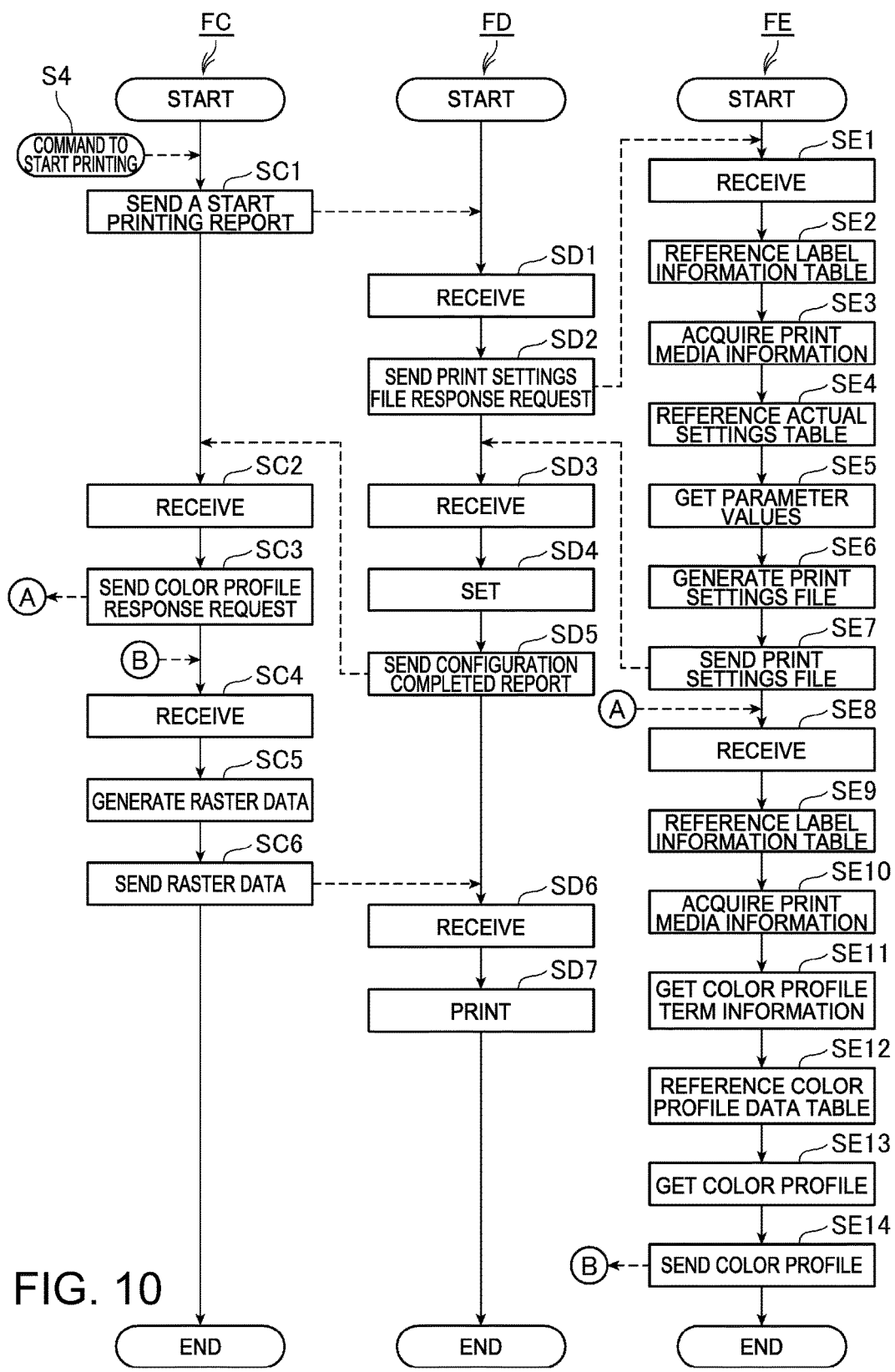
FIG. 10 is a flow chart of the operation of image processing device, printer, and control device.

FIG. 10 is a flow chart describing the operation of the image processing device 6, printer 3, and control device 5 when printing by the printer 3. Flowchart FC in FIG. 10 shows the operation of the image processing device 6, flow chart FD shows the operation of the printer 3, and flowchart FE shows the operation of the control device 5.

The image processing device 6 executes the process shown in flow chart FC through the cooperation of hardware and software, such as a CPU or other hardware reading and running software such as an image processing program 52a. The printer 3 executes the process shown in flow chart FD through the cooperation of hardware and software, such as a CPU or other hardware reading and running software such a program or firmware 42b. The control device 5 executes the process shown in flow chart FE through the cooperation of hardware and software, such as a CPU or other hardware reading and running software such as an image processing program 52a.

As shown in flow chart FC in FIG. 10, to print by the printer 3, the user instructs the image processing device 6 by a specific method to start printing (step S4). When instructing the start of printing, the user also specifies the printer 3 to use for printing. In this example, information identifying the printer 3 (referred to below as a printer identifier) is assigned to each printer 3, and the user specifies the printer identifier for the image processing device 6 by a specific method. The printer identifier may be a value (such as a serial number) unique to each printer 3, or a name assigned to the printer 3 to identify a particular printer 3 on the local area network LNa.

The image processing device controller 50 of the image processing device 6 controls the image processing device communicator 51 in response to the user command to start printing, and sends a start printing report instructing the start of printing to the printer 3 specified by the user (step SC1).

Note that the image processing device storage 52 of the image processing device 6 stores, for each printer 3 connected to the local area network LNa, information required to communicate with the printer 3 (information such as the IP address and the communication protocol to use for communication) relationally to the printer identifier.

As shown in flow chart FD in FIG. 10, the printer controller 40 of the printer 3 controls the printer communicator 41 to receive the start printing report (step SD1).

In response to receiving the start printing report, the printer controller 40 controls the printer communicator 41 to send a print settings file response request to the control device 5 (step SD2). The print settings file response request includes a model identifier identifying the model of printer 3, and the print medium identifier of the print medium installed in the printer 3. The print settings file response request is information requesting transmission of a print settings file.

The printer controller 40 acquires the print medium identifier of the print medium installed in the printer 3 by a specific means. For example, the print medium identifier maybe input by the user using a specific means, the printer controller 40 acquires the print medium identifier input by the user. Alternatively, a communication device that communicates with an IC tag may be disposed to the printer 3, and an IC tag storing the print medium identifier may be disposed to the print medium. In this case, the printer controller 40 controls the communication device to read the print medium identifier registered in the IC tag attached to the print medium, and acquires the print medium identifier read by the communication device.

As shown in flow chart FE in FIG. 10, the control device controller 30 of the control device 5 then controls the control device communicator 31 to receive the print settings file response request (step SE1).

In response to receiving the print settings file response request, the control device controller 30 then references the label information table 321*a* stored in the label information storage 321 of the control device storage 32 (step SE2).

The label information table 321*a* is a database storing, for each printer 3 connected to the local area network LNa to which the control device 5 is connected, a record for each print medium that can be installed in a printer 3.

Each record in the label information table 321*a* contains a printer identifier, model identifier, print medium identifier, and print media information. A record corresponding to a single print medium that can be installed in a single printer 3 includes the printer identifier of that printer 3, the model identifier of the model of that printer 3, a print medium identifier of a single print medium, and print media information corresponding to the particular combination of the model of that printer and the single print medium.

Figure 11:
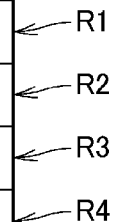
FIG. 11 shows an example of a label information table.

FIG. 11 shows an example of the content of the label information table 321*a* in a format convenient for description.

The label information table 321*a* shown in FIG. 11 is a table for the following configuration. Specifically, a printer 3 (referred to below as the first printer) with the printer identifier "aaa" and the model identifier "KS01", and a printer 3 (referred to below as the second printer) with the printer identifier "bbb" and the model identifier "KS02", are connected to the local area network LNa. A print medium with the print medium identifier "MD01", and a print medium with the print medium identifier "MD02", can be installed to the first printer. A print medium with the print medium identifier "MD02", and a print medium with the print medium identifier "MD03", can be installed to the second printer.

In this case, as shown in FIG. 11, the label information table 321*a* stores, for the first printer, a record R1 corresponding to the print medium with the print medium identifier "MD01", and a record R2 corresponding to the print medium with the print medium identifier "MD02", that can be installed to the first printer. The label information table 321*a* also stores, for the second printer, a record R3 corresponding to the print medium with the print medium identifier "MD02", and a record R4 corresponding to the print medium with the print medium identifier "MD03", that can be installed to the second printer.

The control device controller 30 also communicates as needed with the media server 8, and by synchronizing the print media information in the media list 22*a* and the print media information in the label information table 321*a*, maintains the same content in print media information corresponding to stored printer 3 model and print medium combinations.

As shown in flow chart FE in FIG. 10, after referencing the label information table 321*a* in step SE2, the control device controller 30 finds the corresponding record by comparing the combination of model identifier and print medium identifier contained in the print settings file response request and the combinations of model identifiers and print medium identifiers in the records of the label information table 321*a*. The control device controller 30 then acquires the print media information from the retrieved record (step SE3).

Next, the control device controller 30 references the actual settings table 322*a* stored in the actual content storage 322 of the control device storage 32 (step SE4).

The actual settings table 322*a* stores, for each model of printing system 2 connected to the local area network LNa to which the control device 5 is connected, records as described below for each print medium that can be loaded in each printer 3. More specifically, each record relationally stores, for each parameter, a parameter identifier, candidate parameter values, and the parameter value terms assigned to each candidate parameter value. The candidate parameter values are specific values.

Figure 12:
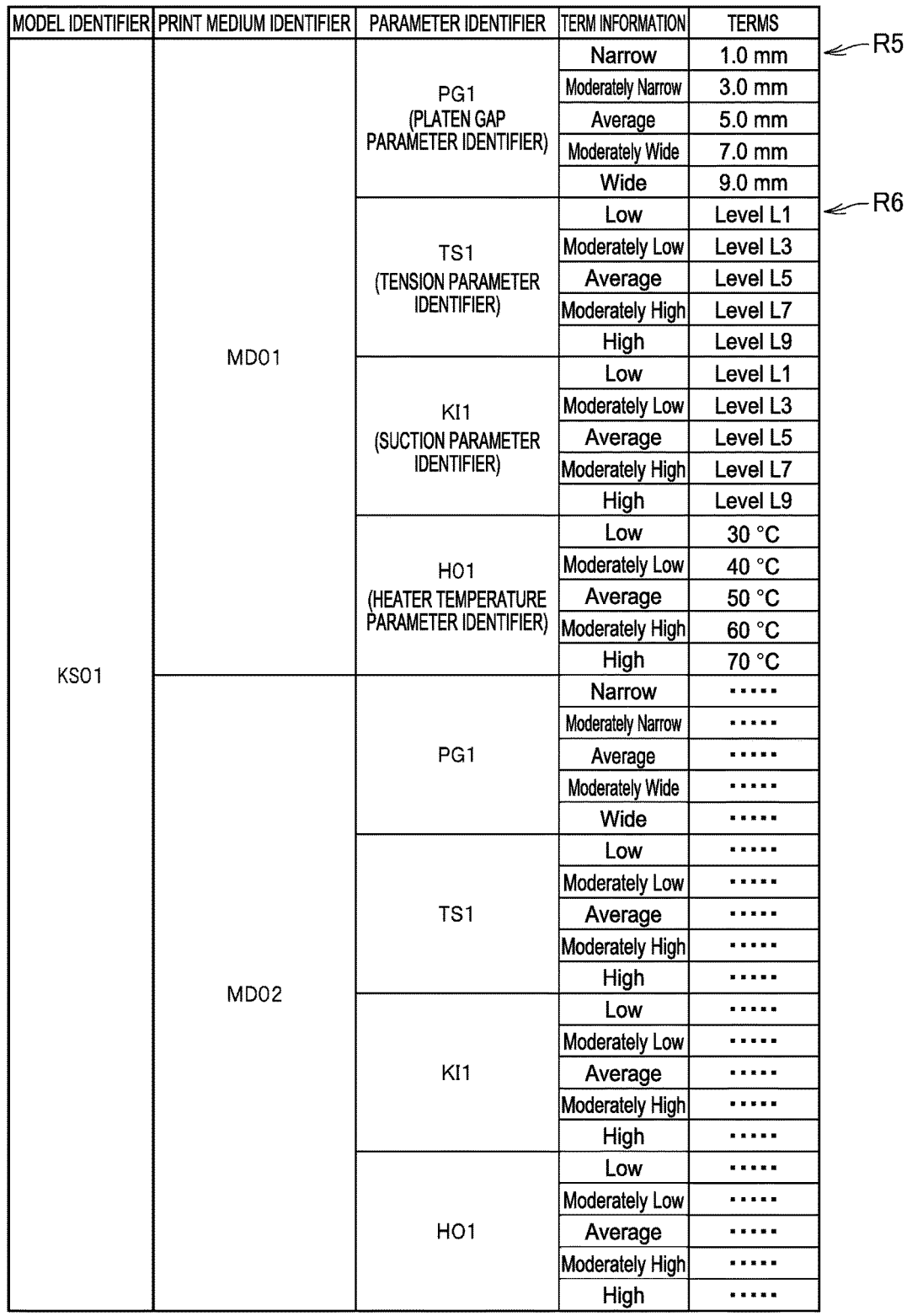
FIG. 12 shows an example of a settings content table.

FIG. 12 shows an example of the content of the settings content table 322*a* in a format useful for description.

The actual settings table 322*a* in FIG. 12 is a table applicable to the following situation. That is, a printer 3 of model KS01 is connected to the local area network LNa. Print media of print medium identifier MD01, and print media of print medium identifier MD02 can be installed in a printer 3 of model KS01.

In record R5 in the actual settings table 322*a* in FIG. 12 are relationally stored, as platen gap parameters for print medium identifier MD01, the parameter identifier of the platen gap parameters, one candidate parameter value (in the example in FIG. 12, 1.0 mm), and the parameter value term assigned to that one candidate parameter value (in the example in FIG. 12, Narrow).

In record R6 in the actual settings table 322*a* in FIG. 12 are relationally stored, as tension parameters for print medium identifier MD01, the parameter identifier of the tension parameters, one candidate parameter value (in the example in FIG. 12, Level 1), and the parameter value term assigned to that candidate parameter value (in the example in FIG. 12, Low).

After referencing the actual settings table 322*a* in step SE4, the control device controller 30, based on the content of the actual settings table 322a referenced in step SE4, and the print media information acquired in step SE3, identifies the parameter values to set for each parameter of the printer 3 that sent the print settings file response request (step SE5).

The process of step SE5 is described below using identifying the parameter value to set for the platen gap parameter as an example.

Based on the acquired print media information, the control device controller 30 determines the parameter value term corresponding to the platen gap parameter from among the parameter value terms included in the print media information. As described above, because the parameter value terms are listed in a predetermined order of parameters in the print media information, the control device controller 30 identifies the parameter value term corresponding to the platen gap parameter based on this order.

Next, the control device controller 30 finds, in the records of the actual settings table 322a, the record containing the matching combination of model identifier extracted from the print settings file response request received in step SE1, print medium identifier extracted from the print settings file response request, the parameter identifier of the platen gap parameters, and the identified parameter value term. Next, the control device controller 30 acquires the candidate parameter value in the identified record as the parameter value to set for the platen gap parameter.

The process of step SE5 is described above using the example of acquiring the parameter value to set as the platen gap parameter. In step SE5, the control device controller 30 executes the same process executed to acquire the platen gap parameter value to acquire the parameter value to set for each of the other parameters.

After identifying the parameter value to set for each of the other parameters in step SE5, the control device controller 30 generates a print settings file (step SE6).

A print settings file is a file relationally storing, for each parameter, the parameter identifier and the parameter value identified in step SE5.

Next, the control device controller 30 controls the control device communicator 31 to send the print settings file generated in step SE6 to the printer 3 (step SE7).

The parameter values set to the parameters of the printer 3 are examples of print control parameters. The print settings file is an example of actual parameter information (print control parameters). As shown in step SE6 and SE7, the control device 5 provides the actual parameter information as a file.

As described above, the control device 5 in this embodiment of the invention does not store data related to the print control parameters (data equivalent to a print settings file) for each combination of printer 3 model and print media information. The control device 5 generates and sends a print settings file based on the actual settings table 322a when requested to send a print settings file. Compared with storing a print settings file for each combination of printer 3 model and print media information, this configuration enables reducing the storage capacity required to store required information related to the settings by establishing conditions enabling providing (supplying) a print settings file (actual parameter information) to the printer 3 as needed.

As shown in flow chart FD in FIG. 10, the printer controller 40 of the printer 3 controls the printer communicator 41 to receive the print settings file (step SD3).

Next, the printer controller 40, based on the print settings file received in step SD3, sets the parameter values to the corresponding parameters (step SD4). More specifically, the printer controller 40 references the parameter file 42a, and for each parameter, writes the settings (parameter values) stored relationally to the parameter identifier in the print settings file. Setting the parameter values for each parameter is completed by the process of step SD4.

In this embodiment of the invention, the process of setting parameter values to parameter items is timed to printing after the print medium is installed in the printer 3. However, this process may be executed when the print medium is installed in the printer 3.

After the parameter values are set to the parameters, the printer controller 40 controls the printer communicator 41 to send a configuration completed report to the image processing device 6 (step SD5).

The configuration completed report includes information (referred to below as the printing mode identifier) identifying the current printing mode of the printer 3, the model identifier of the printer 3 model, and print medium identifier of the print medium installed in the printer 3. The configuration completed report is information reporting that setting the parameter values to the parameters was completed.

As shown in flowchart FC in FIG. 10, the image processing device controller 50 of the image processing device 6 controls the image processing device communicator 51 to receive the configuration completed report (step SC2).

Next, the image processing device controller 50, in response to receiving the configuration completed report in step SC2, controls the image processing device communicator 51 to send a color profile response request to the control device 5 (step SC3).

A color profile response request includes the print medium identifier contained in the configuration completed report received in step SC2, model identifier, and print medium identifier. The color profile response request is information requesting transmission of a color profile.

As shown in flow chart FE in FIG. 10, the control device controller 30 of the control device 5 controls the control device communicator 31 to receive the color profile response request (step SE8).

In response to receiving the color profile response request, the control device controller 30 references the label information table 321a (step SE9).

Next, the control device controller 30, based on the model identifier and print medium identifier contained in the color profile response request, executes the same process as in step SE3, and acquires print media information (step SE10).

Next, the control device controller 30, based on the print media information acquired in step SE10, and the print medium identifier contained in the color profile response request received in step SE8, identifies the color profile term information of the color profile to use when executing the image process for generating raster data (step SE11).

As described above, because the color profile term information is written in the print media information according to the predetermined order of printing modes, the control device controller 30 identifies the color profile term information corresponding to the current printing mode of the printer 3 based on this predetermined order. As described above, the color profile term information is information comprising a combination of hue term, value term, and saturation term.

Next, the control device controller 30 references the color profile data table 322b stored in the actual content storage 322 of the control device storage 32 (step SE12).

As described above, the color profile content table 322b is a table storing a color profile (actual color profile in a file format) for each combination of hue term, value term, and saturation term. For convenience below, a combination of hue term, value term, and saturation term is referred to as a color profile term information type. The color profile content table 322b stores a record for each color profile term information type, and each record stores color profile term information and a color profile.

Figure 13:
FIG. 13 shows an example of a color profile content table.

FIG. 13 shows an example of the content of the color profile content table 322b in a format useful for description.

The server storage 22 of the media server 8 stores a color profile management database 22b. Similarly to the color profile data table 322b, the color profile management database 22b is a database storing a color profile (actual color profile in a file format) for each combination of hue term, value term, and saturation term. The content of the color profiles stored in the color profile management database 22b can be changed by an authorized person using a specific means. The control device controller 30 communicates as needed with the media server 8 to synchronize the color profile data table 322b and color profile management database 22b, and maintain the identity of content in each color profile stored in the color profile data table 322b and each color profile stored in the color profile management database 22b.

After referencing the color profile data table 322b in step SE12, the control device controller 30 finds, in the records of the table, the record corresponding to the color profile term information identified in step SE11, and acquires the color profile stored in the identified record (step SE13).

Next, the control device controller 30 controls the control device communicator 31 to send the color profile acquired in step SE13 to the image processing device 6 (step SE14).

A color profile is equivalent to actual parameter information and image processing parameters.

As described above, the control device 5 in this embodiment of the invention does not store a color profile (image processing parameters) for each combination of printer 3 model, print media information, and printing mode of the model of printer 3. The control device 5 stores, without duplication, a color profile for each color profile term information type. By establishing the conditions enabling providing a color profile (actual parameter information) to the image processing device 6, this configuration enables reducing the storage capacity needed to store color profiles, and reduces the amount of color profile data that must be stored in the control device 5, compared with a configuration storing a color profile for each combination of printer 3 model, print media information, and printing mode of the printer 3.

The same can be said for the media server 8 that stores the color profile management database 22b. In other words, the media server 8 can store, without duplication, a color profile for each type of color profile term information. Compared with storing a color profile for each combination of printer 3 model, print media information, and printing mode of the printer 3, this configuration enables reducing the storage capacity needed to store color profiles, and can reduce the amount of color profile data that must be stored on the media server 8.

Note that color profile term information of the same values may be used for multiple combinations of printer 3 model and print media.

As shown in flow chart FC in FIG. 10, the image processing device controller 50 of the image processing device 6 controls the image processing device communicator 51 to receive the color profile (step SC4).

Next, the image processing device controller 50, by functions of at least RIP software, generates raster data using the color profile received in step SC5 (step SC5).

Note that the data required to generate raster data is previously input to the RIP software. The data required to generate raster data is, for example, image data for images including text generated by word processing software, or image data for graphic images generated by a graphics program, or image data for pictures captured by a digital camera.

After generating raster data, the image processing device controller 50 controls the image processing device communicator 51 to send the generated raster data to the printer 3 (step SC6).

As shown in flow chart FD in FIG. 10, the printer controller 40 of the printer 3 then receives the raster data (step SD6).

Next, the printer controller 40 controls the printing mechanism 43 based on the raster data received in step SD6, and prints images on the print medium by the printing mechanism 43 (step SD7). As described above, the printer controller 40 prints to reflect the parameter values set for the parameters.

As described above, a control device 5 (image processing device) according to this embodiment has label information storage 321 for storing label information related to a combination of printer 3 model and print medium (parameter value terms and color profile term information); and actual content storage 322 relationally storing to the label information the actual parameter information used by the printer 3 to print to the print medium.

When a specific combination of printer 3 model and print medium is identified, and actual parameter information corresponding to that combination is requested, the control device 5 references the label information storage 321, acquires the label information related to that combination, and based on the acquired label information, acquires the actual parameter information from the actual content storage 322.

This configuration enables the control device 5 to reduce the storage capacity required to store the actual parameter information by establishing conditions enabling providing actual parameter information to the device that uses the actual parameter information.

In this embodiment of the invention, the label information (parameter value terms, color profile term information) is a word (term) describing the actual parameter information.

This configuration enables a person, when reading the label information, to intuitively and sensorially understand the content of the actual parameter information corresponding to the label information.

In this embodiment of the invention the actual content storage 322 does not redundantly store actual parameter information, but the same label information stored by the label information storage 321 may be applied to a combination of printer 3 model and print media.

This configuration enables the control device 5 to reduce the storage capacity required to store the actual parameter information by establishing conditions enabling providing actual parameter information to the device that uses the actual parameter information.

In this embodiment of the invention, the control device 5, when providing actual parameter information, supplies the actual parameter information as a file.

This configuration enables the control device 5 to provide the actual parameter information in a file.

In this embodiment of the invention, requesting actual parameter information is done by the device that uses the actual parameter information.

This configuration enables the control device 5 to appropriately provide the actual parameter information to the device that uses the actual parameter information.

In this embodiment of the invention, the actual parameter information includes print control parameters that are set in a printer 3.

This configuration enables the control device 5 to reduce the storage capacity required to store the print control parameters by establishing conditions enabling providing print control parameters to the printer 3.

In this embodiment of the invention, the actual parameter information includes the image processing parameters the image processing device 6 uses in the image process the image processing device 6 executes to generate the print data output to the printer 3 for printing.

This configuration enables the control device 5 to reduce the storage capacity required to store the image processing parameters by establishing conditions enabling providing image processing parameters to the image processing device 6.

In this embodiment of the invention, the actual parameter information includes a color profile as an image processing parameter.

This configuration enables the control device 5 to reduce the storage capacity required to store the color profile, which contains a large amount of data and must be stored efficiently.

In this embodiment of the invention, the actual parameter information includes multiple color profiles according to the printing modes (operating modes) of the printer 3.

This configuration enables the control device 5 to efficiently store a color profile for each printing mode of the printer 3.

Embodiment 2

A second embodiment of the invention is described next.

In the first embodiment described above, parameter value terms are written to the first area A1 of the print media information in a predetermined order of parameters. In this second embodiment of the invention, parameter value indices (indices) are written instead of parameter value terms to the first area A1 of the print media information in a predetermined order of parameters.

A parameter value index is a character previously assigned to each candidate parameter value, and functions as an index identifying a candidate parameter value. One example of a parameter value index is a string of one or more alphabetic characters (such as A, B, or XX), or a string of one or more numeric characters (such as 1, 2, or 10). Each parameter value index assigned to a candidate parameter value of one parameter is a different character.

For example, if the candidate parameter values for the platen gap parameter are 1.0 mm, 3.0 mm, 5.0 mm, 7.0 mm, and 9.0 mm, A may be defined as the parameter value index for the candidate parameter value 1.0 mm; B may be defined as the parameter value index for the candidate parameter value 3.0 mm; C may be defined as the parameter value index for the candidate parameter value 5.0 mm; D may be defined as the parameter value index for the candidate parameter value 7.0 mm; and E may be defined as the parameter value index for the candidate parameter value 9.0 mm.

A parameter value index is information abstractly expressing a candidate parameter value and is not the actual parameter value, and is an example of label information.

In the first embodiment described above, color profile term information is written in a predetermined order of printing modes to the second area A2 of the print media information. In this second embodiment, color profile indices are written to the second area A2 in a predetermined order of printing modes instead of color profile term information. A color profile index is a character previously assigned to each different color profile, and functions as an index identifying a particular color profile. In the first embodiment, there is a different color profile for each combination of hue term, value term, and saturation term, and in this embodiment, a color profile index comprising a different character string is assigned to each color profile.

Figure 14:
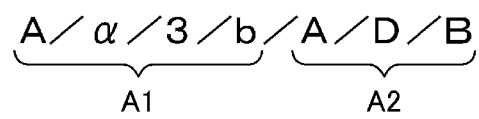
FIG. 14 shows an example of print media information in a second embodiment of the invention.

FIG. 14 shows an example of print media information in this embodiment of the invention.

In first area A1 of the print media information shown in the example in FIG. 14, the parameter value index corresponding to each parameter is written in the order of parameters, in this example, the platen gap parameter, tension parameter, suction parameter, and heater temperature parameter, separated by a first delimiter character. More specifically, in the print media information shown in the example in FIG. 14, the first character, A, is the parameter value index assigned to the candidate parameter value of the platen gap parameter; the second character, α, is the parameter value index assigned to the candidate parameter value of the tension parameter; the third character, 3, is the parameter value index assigned to the candidate parameter value of the suction parameter; and the fourth character, b, is the parameter value index assigned to the candidate parameter value of the heater temperature parameter.

In the second area A2 of the print media information in the example in FIG. 14, the color profile indices corresponding to two printing modes are written in a predetermined order of printing modes separated by a delimiter character.

The parameter value indices and color profile indices are examples of label information.

Arranging the parameter value indices and color profile indices in a predetermined order in the print media information has the same effect as arranging the parameter value terms and color profile term information in a predetermined order.

In the second embodiment of the invention, each record in the actual settings table 322a stores parameter value indices instead of parameter value terms. Each record in the color profile data table 322b stores color profile indices instead of color profile term information.

The control device 5 therefore generates the print settings file based on a actual settings table 322a in which each record contains parameter value indices instead of parameter value terms. The control device 5 also generates the color profile to send to the image processing device 6 based on a color profile data table 322b in which each record stores color profile indices instead of color profile term information.

As described above, the label information in the second embodiment is an index assigned to actual parameter information.

This configuration enables expressing label information by a simple index.

Embodiment 3

A third embodiment of the invention is described next.

Figure 15:
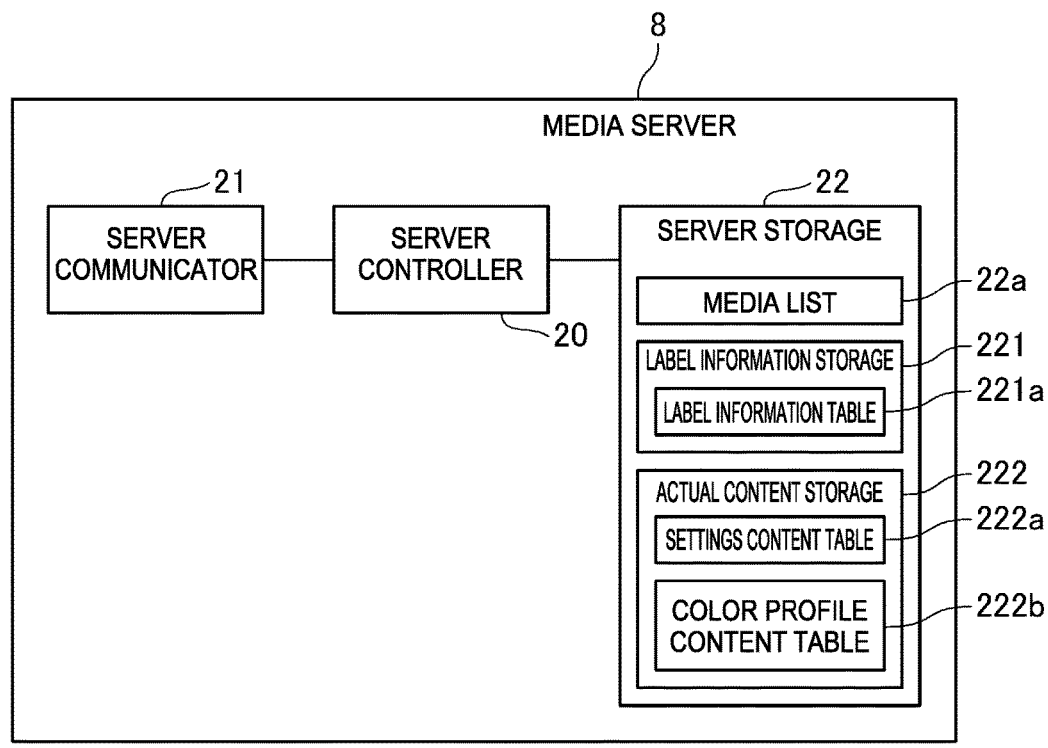
FIG. 15 is a block diagram of the functional configuration of a media server according to a third embodiment of the invention.

FIG. 15 is a block diagram illustrating the functional configuration of a media server 8 according to the third embodiment of the invention.

Note that like parts in the third embodiment and first embodiment are identified by like reference numerals.

In the first embodiment described above, the control device 5 has label information storage 321 and actual content storage 322, the label information storage 321 stores a label information table 321a, and the actual content storage 322 stores a actual settings table 322a and color profile data table 322b. In other words, the control device 5 functions as an information processing device.

As shown in FIG. 15, the server storage 22 of the media server 8 in the third embodiment has label information storage 221, and actual content storage 222.

The label information storage 221 stores a label information table 221a.

The label information table 221a has the same data structure as the label information table 321a in the first recording medium, and for each model of printer 3 managed by the media server 8, has a record for each type of print medium that can be installed in the corresponding model of printer 3.

The actual content storage 222 stores a settings content table 222a and a color profile content table 222b.

The settings content table 222a has the same data structure as the settings content table 322a in the first embodiment, and for each model of printer 3 managed by the media server 8, has a record for each type of print medium that can be installed in the corresponding model of printer 3.

The color profile content table 222b has the same data structure as the color profile content table 322b and color profile management database 22b in the first embodiment, and stores a color profile (actual color profile in a file format) for each combination of hue term, value term, and saturation term.

In this embodiment of the invention, the media server 8 functions as an information processing device.

In this embodiment, instead of the control device 5, the media server 8 executes the processes of flow chart FE in FIG. 10.

More specifically, the printer 3 sends a print settings file response request to the media server 8 instead of to the control device 5. The media server 8, based on the label information table 221a and settings content table 222a, generates a print settings file, and sends the print settings file to the printer 3. The printer 3 then configures the print settings based on the received print settings file.

The image processing device 6 also sends the color profile response request to the media server 8 instead of to the control device 5. Based on the label information table 221a and color profile content table 222b, the media server 8 acquires the appropriate color profile, and sends the acquired color profile to the image processing device 6. Based on the received color profile, the image processing device 6 generates raster data and sends the raster data to the printer 3.

Thus comprised, this embodiment has the same effect as the first embodiment described above.

The invention is described above with reference to a preferred embodiment thereof, but the invention is not limited thereto and can be modified and adapted in many ways without departing from the scope of the accompanying claims.

For example, the printer 3 is described in the foregoing embodiments as a large format printer (LFP), but the printer 3 is not limited to large format printers. The printer 3 is also described as being an inkjet printer, but the printer 3 is not limited to inkjet printers. More specifically, the printer 3 may be any device with the ability to print to print media.

Furthermore, the foregoing embodiments are described using the example of writing parameter values to a parameter file 42a when setting parameter values for parameters, but setting parameter values for parameters is not limited to writing parameters to a parameter file 42a. For example, the parameter values may be written to variables of a specific program that controls the printer 3.

The function blocks described with reference to the accompanying figures are grouped according to the main content of the processes of the functional configurations of the devices to facilitate understanding the invention. The configuration of the devices may be divided into further elements according to the process content. A single functional element may also be configured to execute more processes. The processes of the component elements may also be executed by a single hardware component, or by multiple hardware components. Yet further, the processes of the component elements may be embodied by a single program, or by multiple programs.

The processing units of the flow charts shown in the figures are divided according to the main content of the processes in order to facilitate understanding the processes of individual devices. The invention is not limited by the method of segmenting or naming the processing units. The processes of individual devices can be further divided, according to the process content, into more processing units. Alternatively, single processing units may be further divided into more processing units. Yet further, if the equivalent process can be executed, the order of the processes (steps) in the accompanying flow charts is also not limited to that shown in the figures.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An information processing device comprising:
   label information storage configured to store label information relationally to combinations of printer models and print media;
   actual content storage configured to store, relationally to the label information, actual parameter information that is used to print media by a printer; and
   a controller configured to, when a combination of printer model and print medium is identified and actual parameter information corresponding to that combination is requested, reference the label information storage, identify the label information corresponding to that combination, and acquire actual parameter information from the actual content storage based on the identified label information, wherein the controller is further configured to generate print media information based on the actual parameter information, the printer model, and the print medium, and wherein the print media information is formatted to include a first area listing a first set of parameters in accordance with a first predefined order, the first set of parameters corresponding to printer model configuration settings of the printer, and a second area listing a second set of parameters in accordance with a second predefined order, the second set of parameters corresponding to color profile settings;
   the actual content storage not redundantly storing actual parameter information; and
   the label information is redundantly applied to the combination of printer model and print medium,
   wherein:

the actual parameter information includes a color profile as an image processing parameter used in an image process when executing the image process to generate print data, and the controller is configured to provide an image processor with the color profile that identified the combination of printer model and print medium and each of multiple printing modes of the printer.

2. The information processing device described in claim 1, wherein:
the label information is a term describing actual parameter information.

3. The information processing device described in claim 1, wherein:
the label information is an index assigned to actual parameter information.

4. The information processing device described in claim 1, wherein:
actual parameter information is provided as a file of actual parameter information.

5. The information processing device described in claim 1, wherein:
a request for actual parameter information is asserted by a device that uses the actual parameter information.

6. The information processing device described in claim 1, wherein:
the actual parameter information includes a print control parameter set in a printer.

7. An information processing system comprising:
an information processing device capable of communicating with at least a printer;
the information processing device including:
label information storage configured to store label information relationally to combinations of printer models and print media;
actual content storage configured to store, relationally to the label information, actual parameter information that is used to print media by a printer; and
a controller configured to, when a combination of printer model and print medium is identified and actual parameter information corresponding to that combination is requested, reference the label information storage, identify the label information corresponding to that combination, and acquire actual parameter information from the actual content storage based on the identified label information, wherein the controller is further configured to generate print media information based on the actual parameter information, the printer model, and the print medium, and wherein the print media information is formatted to include a first area listing a first set of parameters in accordance with a first predefined order, the first set of parameters corresponding to printer model configuration settings of the printer, and a second area listing a second set of parameters in accordance with a second predefined order, the second set of parameters corresponding to color profile settings, and wherein:
the actual parameter information includes a color profile as an image processing parameter used in an image process when executing the image process to generate print data, and the controller is configured to provide an image processor with the color profile that identified the combination of printer model and print medium and each of multiple printing modes of the printer.

8. An information processing system comprising:
a media server configured to generate instructions that, when implemented, cause a print media registration user interface to be displayed, wherein a layout of the print media registration user interface includes:
a first set of selectable options for modifying one or more configuration settings of a printer; and
a second set of selectable options for modifying a color profile of the printer, the second set of selectable options including a hue setting, a value setting associated with raster dot data, and a saturation value;

label information storage configured to store label information relationally to combinations of printer models and print media;

actual content storage configured to store, relationally to the label information, actual parameter information that is used to print to print media by the printer; and a controller configured to, when a combination of printer model and print medium is identified and actual parameter information corresponding to that combination is requested, reference the label information storage, identify the label information corresponding to that combination, and acquire actual parameter information from the actual content storage based on the identified label information, wherein the controller is further configured to generate print media information based on the actual parameter information, the printer model, and the print medium, and wherein the print media information is formatted to include a first area listing a first set of parameters in accordance with a first predefined order, the first set of parameters corresponding to printer model configuration setting of the printer, and a second area listing a second set of parameters in accordance with a second predefined order, the second set of parameters corresponding to color profile setting;

the actual content storage not redundantly storing actual parameter information; and the label information is redundantly applied to a combination of printer model and print medium.

* * * * *